United States Patent [19]

Nogami

[11] 4,090,049
[45] May 16, 1978

[54] SEALED RESERVOIR FOR BRAKE MASTER CYLINDER

[75] Inventor: Tomoyuki Nogami, Toyota, Japan

[73] Assignee: Toyota Jidosha Kogyo Kabushiki Kaisha, Toyota, Japan

[21] Appl. No.: 709,184

[22] Filed: Jul. 27, 1976

[30] Foreign Application Priority Data

Aug. 14, 1975 Japan .................. 50-98864

[51] Int. Cl.² .......................................... H01H 35/18
[52] U.S. Cl. .................. 200/84 C; 73/322.5; 340/244 A; 200/82 E
[58] Field of Search ............... 73/319, 322.5; 137/852; 340/244 A, 244 E, 59; 200/83 L, 83 Q, 84 B, 84 C, 61.2, 302, 82 D, 82 E; 188/316, 317

[56] References Cited

U.S. PATENT DOCUMENTS

| 3,564,175 | 2/1971 | Cooper | 200/82 E |
| 3,611,220 | 10/1971 | Hoffman | 200/82 E |
| 3,947,813 | 3/1976 | Uemura | 340/59 |

*Primary Examiner*—Gerald P. Tolin
*Attorney, Agent, or Firm*—Stevens, Davis, Miller & Mosher

[57] ABSTRACT

In a fluid reservoir adapted for mounting on a brake master cylinder, an annular check valve is mounted on the outer periphery of a float and is slidably engaged with the inner wall of the reservoir casing to provide an air-tight seal for brake fluid stored within the casing.

7 Claims, 2 Drawing Figures

SEALED RESERVOIR FOR BRAKE MASTER CYLINDER

BACKGROUND OF THE INVENTION

The present invention relates to a fluid reservoir for an hydraulic brake master cylinder, and more particularly to an improved sealed fluid reservoir in which brake fluid is constantly sealed against the surrounding air regardless of increase or decrease in the amount of brake fluid.

In conventional sealed reservoirs of this kind, an extendable diaphragm seal member is assembled with the opening of the reservoir casing to provide a fluid-tight seal against the surrounding air for the brake fluid stored within the casing and to prevent entrance of water into the brake fluid. In being adapted to the diaphragm seal member, the size of the fluid reservoir must be made larger because the interior of the casing is occupied by the diaphragm seal member. Furthermore, if the diaphragm is designed as a thin film to minimize the volume of the seal member so as to permit the reservoir to be made smaller, the diaphragm seal member becomes less durable and higher in production cost because of difficulty of fabrication.

SUMMARY OF THE INVENTION

It is an object of the present invention to provide an improved sealed reservoir in which brake fluid stored in a reservoir casing is constantly sealed without reduction of the capacity in the casing.

Another object is to provide an improved sealed reservoir in which sealing means, mounted on a float member, provides an air-tight seal against the surrounding air for brake fluid stored in the reservoir casing.

According to the present invention there is provided a fluid reservoir adapted for mounting on a brake master cylinder which comprises:

a casing for storing an amount of brake fluid; a sealing cap in the upper opening of the casing to seal the interior of the latter;

a float having a central opening arranged in the casing for vertical movement in response to variations in fluid level in the casing, the float being provided with a central aperture;

a first check valve secured to the outer periphery of the float and slidably engaged with the inner wall of the casing to permit only flow of the air into either the upper or lower compartment into which the float subdivides the casing; and a second check valve secured to the center of the float to permit only the air flowing through the aperture to enter either the lower or upper compartment.

BRIEF DESCRIPTION OF THE DRAWINGS

The above-mentioned and further objects and features of the present invention will become clear from the following description with reference to the accompanying drawings, in which.

DESCRIPTION OF THE PREFERRED EMBODIMENT

Figure 1:
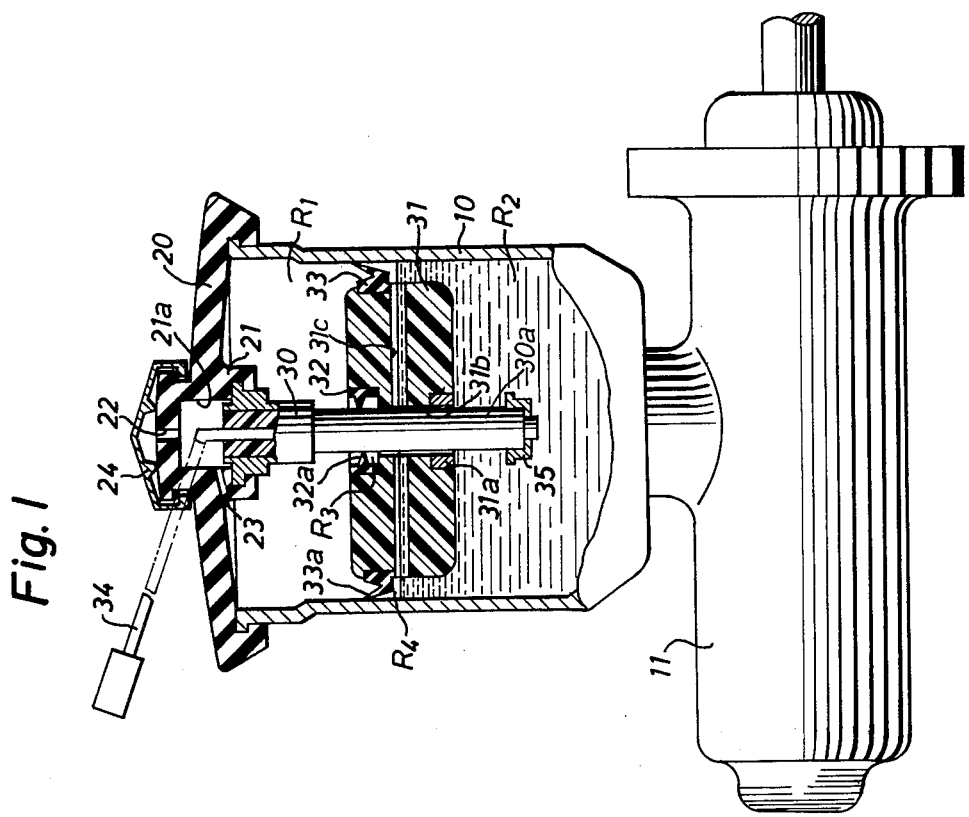
FIG. 1 shows an elevational view, partially in section, of a master cylinder having a sealed fluid reservoir in accordance with the present invention

Referring now to FIG. 1, reservoir casing 10 is rigidly mounted on longitudinal body 11 of a brake master cylinder to constantly store brake fluid therein as a supply for the master cylinder. The upper opening of casing 10 is closed by a fluid-tight main cap 20 made of synthetic rubber. Main cap 20 is provided at the center of its inner wall with an annular boss 21 which projects toward the interior of the casing 10. A small vent hole 22 is provided in the head of cap 20 to connect an inner bore 21a of boss 21 to the atmosphere and a passage 23 is provided on the base of the boss 21 to connect inner bore 21a to the interior of casing 10. In addition, a metallic auxiliary cap 24 is loosely mounted on the head of main cap 20 to cover the vent hole 22.

Figure 2:
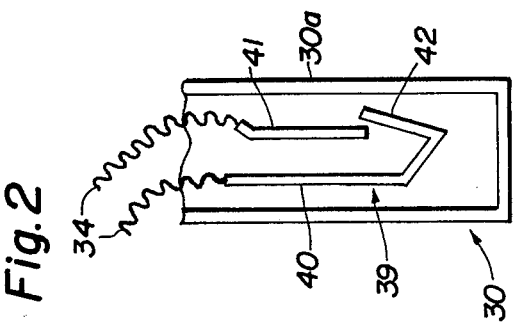
FIG. 2 shows an enlarged schematic sectional view of one type of magnetic reed switch.

Referring to FIG. 2, there is seen in the interior of casing 10, a magnetically operable switch assembly, indicated generally by reference character 30, which comprises a rod element 30a secured at its upper end to the annular boss 21 and extends downward through float member 31 which is positioned to float on the brake fluid stored within casing 10. The rod element 30a is provided therein with a normally open reed switch indicated generally as 39 which is connected to an electric alarm circuit by way of lead wire 34 to warn of a dangerous decrease in the quantity of the brake fluid. The float member and its magnet 31a are not shown in FIG. 2 for purposes of clarity. The float member 31 is arranged in the casing 10 for vertical movement in response to variations in brake fluid level in casing 10. Float member 31 has a ring-shaped permanent magnet 31a secured to the bottom of the float 31. The downward movement of float member 31 is restricted by a stopper 35 fixed to the lower end of rod element 30a. Float member 31 is provided with a central aperture 31b through which rod element 30a passes. Radial passages 31c in the float member permit the flow of brake fluid therethrough.

Float member 31 is further provided at the center of its upper surface with a first annular seal member 32 and on its outer periphery with a second annular seal member 33. The first seal member 32 is made of elastic material such as synthetic rubber and has an annular lip 32a which extends radially inward to provide air-tight engagement with the outer periphery of the rod element 30a. The second seal member 33 is also made of elastic material such as synthetic rubber and has an annular lip 33a which extends radially outward to provide air-tight engagement with the inner wall of casing 10. Thus, the interior of the casing 10 is air-tightly subdivided into two compartments $R_1$ and $R_2$ by means of the first and second seal members 32a of float 31 and 33a. The upper compartment $R_1$ communicates with the atmosphere through passage 23 and vent hole 22, while the lower compartment $R_2$ is filled with brake fluid.

In the above described embodiment, the annular lip 32a of the first seal member 32 acts as a check valve to permit only the flow of air into lower compartment $R_2$ from upper compartment $R_1$, while the annular lip 33a of the second seal member 33 acts as a check valve to permit only the flow of air out from lower compartment $R_2$ into upper compartment $R_1$. Furthermore, two annular spaces, $R_3$ and $R_4$, are formed in the lower compartment above the surface of the brake fluid in casing 10 and are sealed by the inner and outer check valves 32a and 33a respectively. Annular spaces $R_3$ and $R_4$ also communicate with each other through the radial passages 31c in float member 31.

In use of the sealed fluid reservoir described above, when the surface of the brake fluid in casing 10 is maintained at a predetermined level, inner and outer check valves 32a and 33a are self-biased against the outer periphery of the rod element 30a and the inner wall of casing 10, respectively, to seal lower compartment $H_2$, including the inner and outer spaces $R_3$ and $R_4$.

As the level of fluid in casing 10 gradually falls due to shrinkage caused by a drop of the ambient temperature or decrease in the amount of brake fluid, caused by abrasion of the brake linings, the float member 31 moves down smoothly as the fluid level falls. Atmospheric air then flows into the upper compartment $R_1$ through vent hole 22 and the passage 23 of main cap 20. In this instance, the seals by check valves 32a and 33a are well maintained to perfectly seal the brake fluid against the surrounding air.

If the brake fluid level drops rapidly in response to operation of the master cylinder, inner and outer annular spaces $R_3$ and $R_4$ acquire a negative pressure due to delay of the downward movement of float member 31. When this happens, inner check valve 32a opens as a result of the pressure difference between compartments $R_1$ and $R_2$ so that the air in upper compartment $R_1$ flows into inner space $R_3$ through the check valve 32a and into the outer space $R_4$ through the radial passages 31c of float member 31. This serves to permit float member 31 to move smoothly downward with the outer check valve 33a closed. The inner check valve 32a then closes instantly to seal lower compartment $R_2$.

Referring once more to FIG. 2, it is seen that the reed switch comprises a pair of stationary conductors 40 and 41 and a normally open movable contact 42. When the brake fluid level drops below a predetermined minimum due to leakage, contact 42, of the reed switch within the switch assembly 30 is closed by magnetic force of the permanent magnet 31a of the float to activate the electric alarm circuit to warn the driver of the shortage of brake fluid.

Furthermore, if the brake fluid level rapidly due to expansion of the brake fluid caused by a rise in the ambient temperature, the air in upper compartment $R_1$ is discharged externally through passage 23 and vent hole 22 of main cap 20 in response to the upward movement of float member 31. In this instance, if the float member 31 does not move up smoothly, the internal pressure within inner and outer spaces $R_3$ and $R_4$ increases in response to rise in fluid level. Outer check valve 33a then opens because of the pressure difference between the two compartments $R_1$ and $R_2$ so that the compressed air in spaces $R_3$ and $R_4$ flows into the upper compartment $R_1$ through radial passages 31c and outer check valve 33a. This drops the pressure in spaces $R_3$ and $R_4$ back down to atmospheric pressure level and check valve 33a closes instantly to seal the lower compartment $R_1$.

From the above description of the preferred embodiment, other structural modifications and adaptations will become apparent to those skilled in the art without departing from the spirit of the invention.

What is claimed is:

1. A fluid reservoir adapted for mounting on a brake master cylinder, comprising:
   a casing for storing an amount of brake fluid, said casing having an opening in the top thereof;
   a sealing cap detachably secured in said opening to seal the interior of said casing;
   a float arranged in said casing for vertical movement in response to variations in fluid level in said casing, said float subdividing said casing into upper and lower compartments, said float being provided at the center thereof with an aperture;
   a first check valve secured to the outer periphery of said float and slidably engaged with the inner wall of said casing to permit only flow of air into either of said upper or lower compartment; and
   a second check valve secured to the center of said float to permit only the air flowing through the aperture into either the lower or upper compartment.

2. A fluid reservoir as claimed in claim 1, further comprising switch means arranged in said casing to issue a warning signal when said float moves to a lower warning position in accordance with a predetermined minimum fluid level in said casing, said switch means including a vertically extending rod element having an upper end secured to said seal cap and a lower portion extending into the brake fluid through said aperture of said float, and wherein said second check valve cooperates with the outer periphery of said rod element to seal said aperture.

3. A fluid reservoir as claimed in claim 2, wherein said first check valve comprises an annular lip secured to the outer periphery of said float and cooperating with the inner wall of said casing to permit only flow of the air into the upper compartment from the lower compartment, and said second check valve comprises an annular lip secured to the central portion of said float and cooperating with the outer periphery of said rod element to permit only flow of the air into the lower compartment from the upper compartment.

4. A fluid reservoir as claimed in claim 1, wherein said float is provided with a radial passage extending therethrough, the aperture in said float forms an inner annular space, the inner wall of the casing together with said float defining an outer annular space, and said inner annular space communicates with said outer annular space by means of said radial passage in the float.

5. A fluid reservoir as claimed in claim 2, wherein said float is provided at the bottom thereof with a permanent magnet and said switch means includes a magnetically operable switch assembled within said rod element closable by the force of said magnet to issue a warning signal when said float moves to the lower warning position.

6. A fluid reservoir as claimed in claim 2, wherein said sealing cap is provided on the central inner wall thereof with an annular boss and wherein said rod element is secured at the upper end thereof to said annular boss.

7. A fluid reservoir as claimed in claim 6, wherein the head of said cap is provided with a vent hole to connect the interior of said annular boss with the atmosphere and wherein said annular boss is provided with a passage whereby the interior of said boss communicates with the casing.

* * * * *